(12) United States Patent
Kuninaka

(10) Patent No.: US 11,524,528 B2
(45) Date of Patent: Dec. 13, 2022

(54) PNEUMATIC TIRE

(71) Applicant: The Yokohama Rubber Co., LTD., Tokyo (JP)

(72) Inventor: Mizuki Kuninaka, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 230 days.

(21) Appl. No.: 16/492,029

(22) PCT Filed: Dec. 22, 2017

(86) PCT No.: PCT/JP2017/046132
§ 371 (c)(1),
(2) Date: Sep. 6, 2019

(87) PCT Pub. No.: WO2018/163567
PCT Pub. Date: Sep. 13, 2018

(65) Prior Publication Data
US 2021/0129592 A1    May 6, 2021

(30) Foreign Application Priority Data
Mar. 6, 2017 (JP) .............................. JP2017-041507

(51) Int. Cl.
*B60C 11/12* (2006.01)
(52) U.S. Cl.
CPC ...... *B60C 11/1281* (2013.01); *B60C 11/1204* (2013.01); *B60C 11/1236* (2013.01);
(Continued)

(58) Field of Classification Search
CPC ............. B60C 11/1236; B60C 11/1263; B60C 11/1281
See application file for complete search history.

(56) References Cited

U.S. PATENT DOCUMENTS

2008/0271827 A1* 11/2008 Morrison ............ B60C 11/0309
152/209.25
2011/0139325 A1* 6/2011 Janesh .................. B60C 11/032
152/209.25
(Continued)

FOREIGN PATENT DOCUMENTS

| CN | 104822545 | 8/2015 |
|---|---|---|
| DE | 35 31 047 | 3/1987 |

(Continued)

OTHER PUBLICATIONS

Machine translation for Japan 2015-231812 (Year: 2021).*
(Continued)

*Primary Examiner* — Steven D Maki
(74) *Attorney, Agent, or Firm* — Thorpe North & Western

(57) ABSTRACT

In a pneumatic tire, a sipe includes an edge on a leading side and an edge on a trailing side; the edge on the leading side and the edge on the trailing side each include a chamfered portion shorter than a sipe length of the sipe; a non-chamfered region in which other chamfered portions are not present is provided at portions facing the chamfered portions of the sipe; a maximum depth of the chamfered portion is less than a maximum depth of the sipe; a sipe width of the sipe is constant in a range from an end portion located on an inner side in a tire radial direction of the chamfered portion to a groove bottom of the sipe; and a raised bottom portion is disposed in at least one section of the chamfered portion.

12 Claims, 8 Drawing Sheets

(52) U.S. Cl.
CPC ...... *B60C 11/1259* (2013.01); *B60C 11/1263* (2013.01); *B60C 2011/1213* (2013.01)

(56) References Cited

U.S. PATENT DOCUMENTS

| | | |
|---|---|---|
| 2013/0206298 A1 | 8/2013 | Guillermou et al. |
| 2015/0210121 A1 | 7/2015 | Sanae |
| 2016/0023518 A1 | 1/2016 | Kawakami |
| 2016/0152084 A1 | 6/2016 | Murata |
| 2017/0001479 A1 | 1/2017 | Takahashi |
| 2017/0297378 A1 | 10/2017 | Honda |
| 2018/0015788 A1 | 1/2018 | Hayashi |
| 2018/0162166 A1 | 6/2018 | Hiraishi |

FOREIGN PATENT DOCUMENTS

| | | | |
|---|---|---|---|
| DE | 10 2013 201 699 | | 8/2013 |
| JP | 11-048720 A | * | 2/1999 |
| JP | 2013-537134 | | 9/2013 |
| JP | 2014-184736 | | 10/2014 |
| JP | 2015-134575 | | 7/2015 |
| JP | 2015-140047 | | 8/2015 |
| JP | 2015-160487 | * | 9/2015 |
| JP | 2015-231812 | | 12/2015 |
| JP | 2015-231812 A | * | 12/2015 |
| WO | WO 2012/032144 | | 3/2012 |
| WO | WO 2014/142349 | | 9/2014 |
| WO | WO 2015/011964 | | 1/2015 |
| WO | WO 2015/115015 | | 8/2015 |
| WO | WO 2016/125814 | | 8/2016 |
| WO | WO 2016/199402 | | 12/2016 |

OTHER PUBLICATIONS

Machine translation for Japan 2015-160487 (Year: 2021).*
Machine translation for Japan 11-048720 (Year: 2021).*
International Search Report for International Application No. PCT/JP2017/046132 dated Apr. 3, 2018, 3 pages, Japan.

* cited by examiner

PNEUMATIC TIRE

TECHNICAL FIELD

The present technology relates to a pneumatic tire and particularly relates to a pneumatic tire that can provide improved steering stability performance on dry road surfaces and improved steering stability performance on wet road surfaces in a compatible manner by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates.

Various pneumatic tires have been proposed in which sipes are formed in a tread pattern and chamfered (for example, see Japan Unexamined Patent Publication No. 2013-537134). When the sipes are formed and chamfered, edge effects may be lost depending on the shape of the chamfers, and depending on the dimensions of the chamfers, improvement of steering stability performance on dry road surfaces or improvement of steering stability performance on wet road surfaces may be insufficient.

SUMMARY

The present technology provides a pneumatic tire that can provide improved steering stability performance on dry road surfaces and improved steering stability performance on wet road surfaces in a compatible manner by devising a sipe chamfer shape.

A pneumatic tire according to an embodiment of the present technology is a pneumatic tire, comprising:
  main grooves extending in a tire circumferential direction in a tread portion; and
  a sipe extending in a tire lateral direction disposed in a rib defined by the main grooves; wherein
  the sipe comprises an edge on a leading side and an edge on a trailing side;
  the edge on the leading side or the edge on the trailing side comprises a chamfered portion; and
  a raised bottom portion is disposed in at least one section of the chamfered portion.

Another embodiment of the present technology is a pneumatic tire, comprising:
  main grooves extending in a tire circumferential direction in a tread portion; and
  a sipe extending in a tire lateral direction disposed in a rib defined by the main grooves; wherein
  the sipe comprises an edge on a leading side and an edge on a trailing side;
  the edge on the leading side and the edge on the trailing side each comprise a chamfered portion shorter than a sipe length of the sipe;
  a non-chamfered region in which other chamfered portions are not present is provided at portions facing the chamfered portions of the sipe;
  a maximum depth y (mm) of the chamfered portion is less than a maximum depth x (mm) of the sipe;
  a sipe width of the sipe is constant in a range from an end portion located on an inner side in a tire radial direction of the chamfered portion to a groove bottom of the sipe; and
  a raised bottom portion is disposed in at least one section of the chamfered portion.

In an embodiment of the present technology, the sipe includes the edge on the leading side and the edge on the trailing side, the edge on the leading side or the edge on the trailing side include the chamfered portion, and the raised bottom portion is disposed in at least one section of the chamfered portion. This allows the drainage effect to be enhanced via the chamfered portion and, with the raised bottom portion formed in the chamfered portion functioning to suppress the deformation of the blocks when the tire comes into contact with the ground, block rigidity to be increased. As a result, the steering stability performance on dry road surfaces and the steering stability performance on wet road surfaces can be enhanced in a well-balanced manner.

In an embodiment of the present technology, the pneumatic tire includes sipes that extend in the tire lateral direction in ribs defined by the main grooves. The chamfered portion that is shorter than the sipe length of the sipe is provided on each of the edge on the leading side and the edge on the trailing side of the sipe, and the non-chamfered regions in which other chamfered portions are not present are disposed at the portions facing the chamfered portions of the sipe. Thus, the drainage effect can be improved with the chamfered portions, and a water film can be effectively removed by the edge effect in the non-chamfered regions. As a result, the steering stability performance on wet road surfaces can be greatly improved. Moreover, the chamfered portion and the non-chamfered region are disposed alongside each other on the edge on the leading side and the edge on the trailing side in this manner. Thus, the effect of enhancing wet performance as described above when braking and driving can be maximally achieved. Additionally, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Furthermore, since the raised bottom portion is disposed in at least one section of the chamfered portion, the raised bottom portion of the chamfered portion acts to suppress movement of the block when the tire come into contact with the ground. This can increase block rigidity. As a result, the steering stability performance on dry road surfaces and the steering stability performance on wet road surfaces can be enhanced in a well-balanced manner.

In an embodiment of the present technology, preferably, the chamfered portion comprises a turned back portion shaped with an acute angle; and
  the raised bottom portion of the chamfered portion is disposed adjacent to the turned back portion. In this way, the turned back portion of which block rigidity is particularly prone to being reduced, can be reinforced, leading to an improvement in block rigidity. As a result, the steering stability performance on dry road surfaces and the steering stability performance on wet road surfaces can be enhanced in a well-balanced manner.

In an embodiment of the present technology, preferably, the sipe comprises a discontinuous portion at a position where portions of the chamfered portions that face one another overlap; and the raised bottom portion of the chamfered portion is disposed adjacent to the discontinuous portion. In this way, the steering stability performance on dry road surfaces and the steering stability performance on wet road surfaces can be enhanced in a well-balanced manner.

In an embodiment of the present technology, preferably the maximum depth x (mm) of the sipe and the maximum depth y (mm) of the chamfered portions satisfy a relationship of Formula (1). In this way, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner.

$$x \times 0.1 \leq y \leq x \times 0.3 + 1.0 \quad (1)$$

In an embodiment of the present technology, a projected area of the raised bottom portion in the chamfered portion is preferably from 5% to 40% of a projected area of the chamfered portion. In this way, the steering stability performance on dry road surfaces and the steering stability performance on wet road surfaces can be enhanced in a well-balanced manner.

In an embodiment of the present technology, a raised bottom width of the raised bottom portion in the chamfered portion is preferably from 40% to 80% of a chamfer width of the chamfered portion. In this way, the steering stability performance on dry road surfaces and the steering stability performance on wet road surfaces can be enhanced in a well-balanced manner.

In an embodiment of the present technology, preferably, a raised bottom length of the raised bottom portion in the chamfered portion is from 5% to 40% of a chamfer length of the chamfered portion. In this way, the steering stability performance on dry road surfaces and the steering stability performance on wet road surfaces can be enhanced in a well-balanced manner. More preferably, the range is from 20% to 30%.

In an embodiment of the present technology, a raised bottom depth of the raised bottom portion in the chamfered portion is preferably from 20% to 80% of the maximum depth y of the chamfered portion. In this way, the steering stability performance on dry road surfaces and the steering stability performance on wet road surfaces can be enhanced in a well-balanced manner. More preferably, the range is from 40% to 60%.

In the present technology, "projected area of the chamfered portion" is the area measured when the chamfered portion is projected in a normal line direction of the road contact surface of the tread portion. "Projected area of the raised bottom portion in the chamfered portion" is the area measured when the raised bottom portion is projected in a normal line direction of the road contact surface of the tread portion.

DETAILED DESCRIPTION

Figure 1:
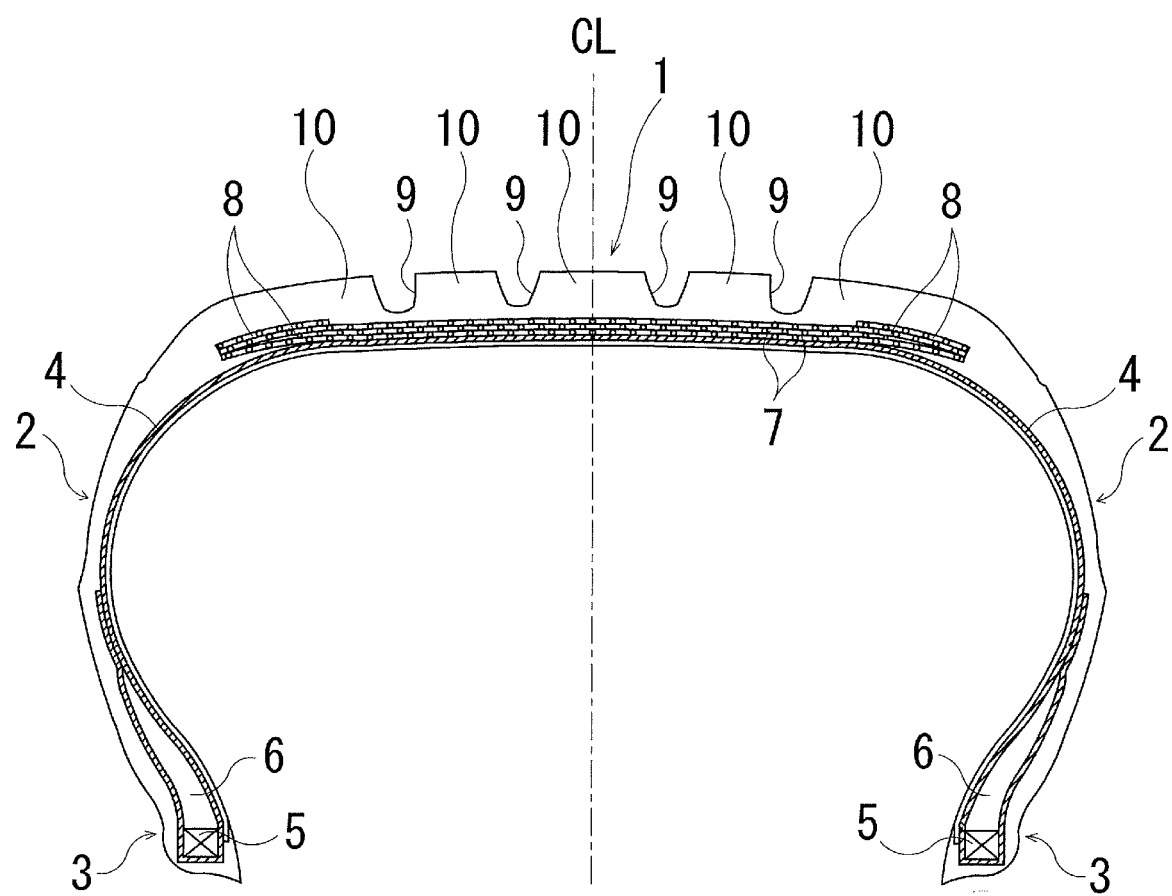
FIG. 1 is a meridian cross-sectional view illustrating a pneumatic tire according to an embodiment of the present technology.

Configurations of embodiments of the present technology are described in detail below with reference to the accompanying drawings. In FIG. 1, CL denotes the tire center line.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define a plurality of ribs 10 in the tread portion 1.

Note that the tire internal structure described above represents a typical example for a pneumatic tire, and the pneumatic tire is not limited thereto.

Figure 2:
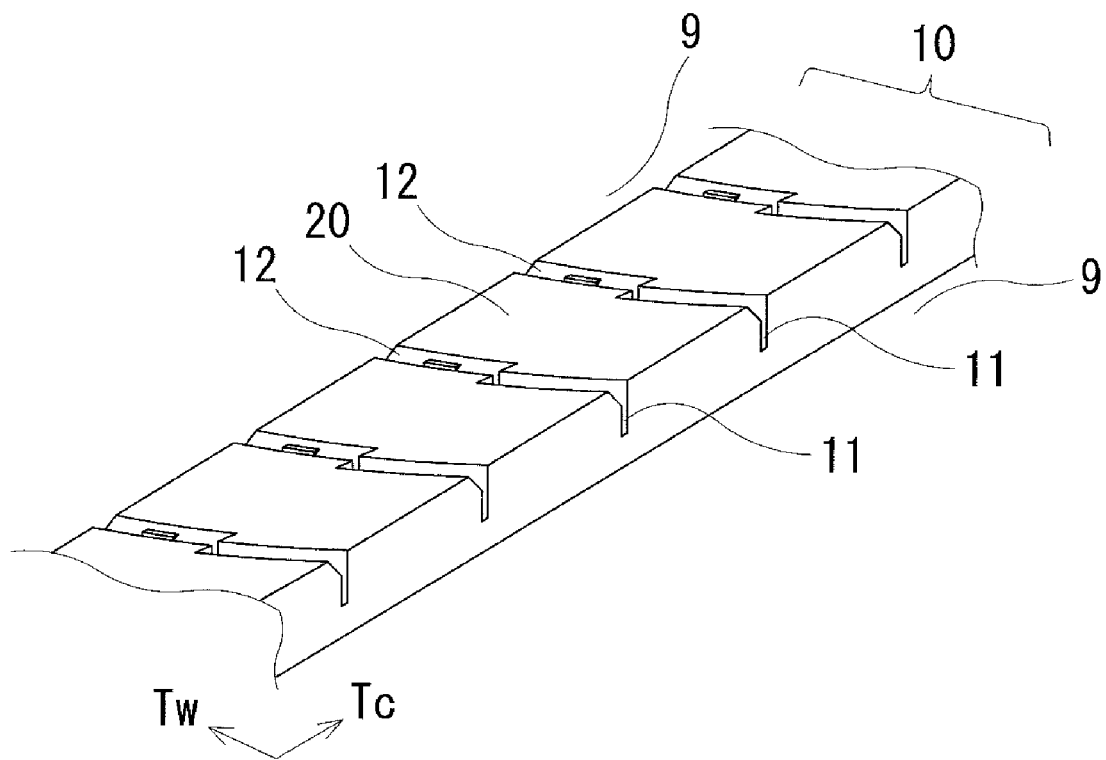
FIG. 2 is a perspective view illustrating a portion of a tread portion of a pneumatic tire according to an embodiment of the present technology.
Figure 3:
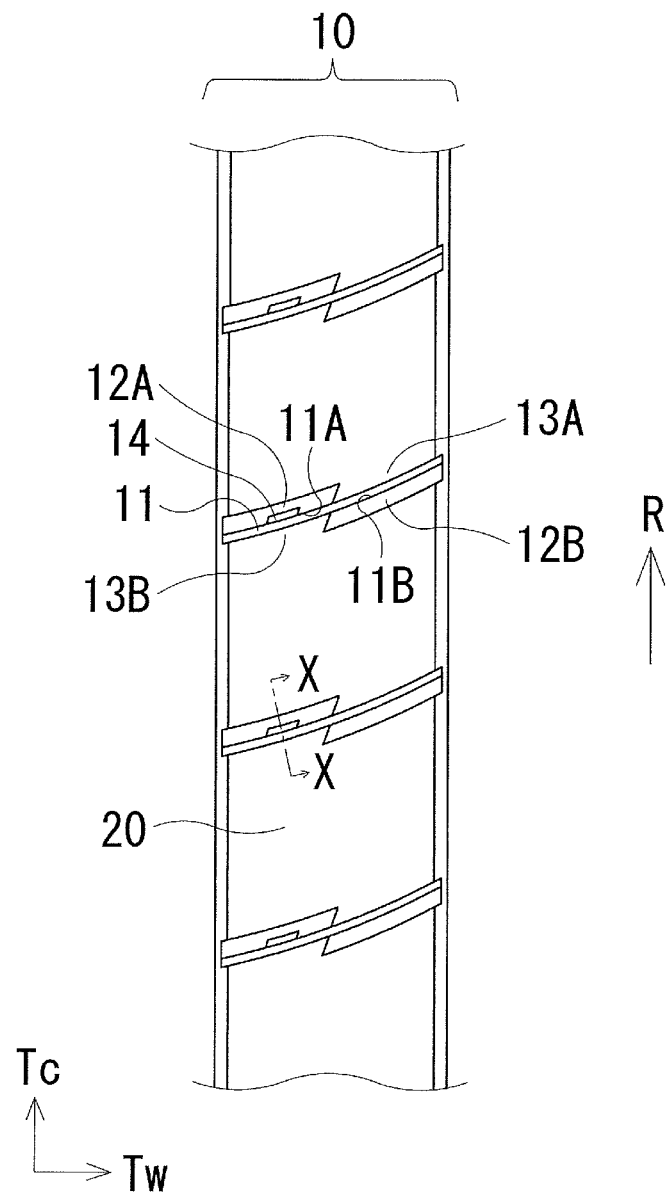
FIG. 3 is a plan view illustrating a portion of a tread portion of a pneumatic tire according to an embodiment of the present technology.
Figure 4:
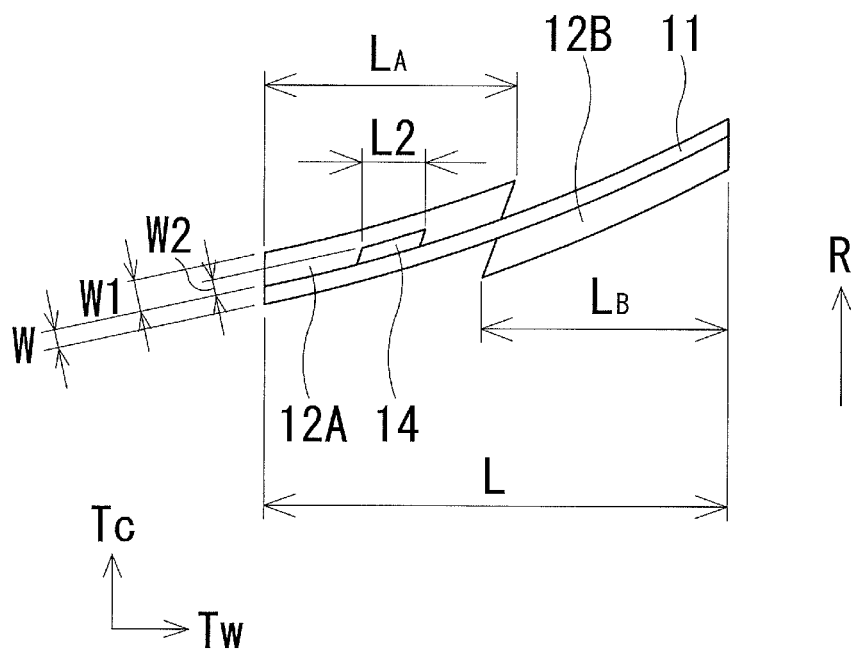
FIG. 4 is a plan view illustrating a sipe and a chamfered portion thereon formed in the tread portion of FIG. 3.

FIGS. 2 to 5 are views illustrating a portion of a tread portion of a pneumatic tire according to an embodiment of the present technology. In FIGS. 2 to 4, Tc indicates the tire circumferential direction and Tw indicates the tire lateral direction. As illustrated in FIG. 2, the ribs 10 include sipes 11 extending in the tire lateral direction that include a chamfered portion 12; and blocks 20 defined by the sipes 11. The sipes 11 are narrow grooves having a groove width of 1.5 mm or less.

As illustrated in FIG. 3, the sipes 11 have an overall shape that is curved and are formed in the rib 10 at intervals in the tire circumferential direction. The sipe 11 includes an edge 11A on the leading side with respect to a rotation direction R and an edge 11B on the trailing side with respect to the rotation direction R. The chamfered portions 12 are formed on the edge 11A on the leading side and the edge 11B on the trailing side.

The chamfered portions 12 includes a chamfered portion 12A on the leading side with respect to the rotation direction R and a chamfered portion 12B on the trailing side with respect to the rotation direction R. At portions facing the chamfered portions 12, non-chamfered regions 13 in which other chamfered portions are not present are provided. In other words, a non-chamfered region 13B on the trailing side with respect to the rotation direction R is provided at a portion facing the chamfered portion 12A, and a non-chamfered region 13A on the leading side with respect to the rotation direction R is provided at a portion facing the chamfered portion 12B. The chamfered portion 12 and the non-chamfered region 13 in which other chamfered portions are not present are disposed adjacent to one another on the edge 11A on the leading side and the edge 11B on the trailing side of the sipe 11 in this manner.

As illustrated in FIG. 4, the lengths of the sipe 11 and the chamfered portions 12A, 12B in the tire lateral direction are defined as a sipe length L and chamfer lengths $L_A$, $L_B$, respectively. The sipe length L and the chamfer lengths $L_A$, $L_B$ are lengths in the tire lateral direction from one end portion to the other end portion for each of the sipes 11 and the chamfered portions 12A, 12B. The chamfer lengths $L_A$, $L_B$ of the chamfered portions 12A, 12B are formed shorter than the sipe length L of the sipe 11.

Figure 5:
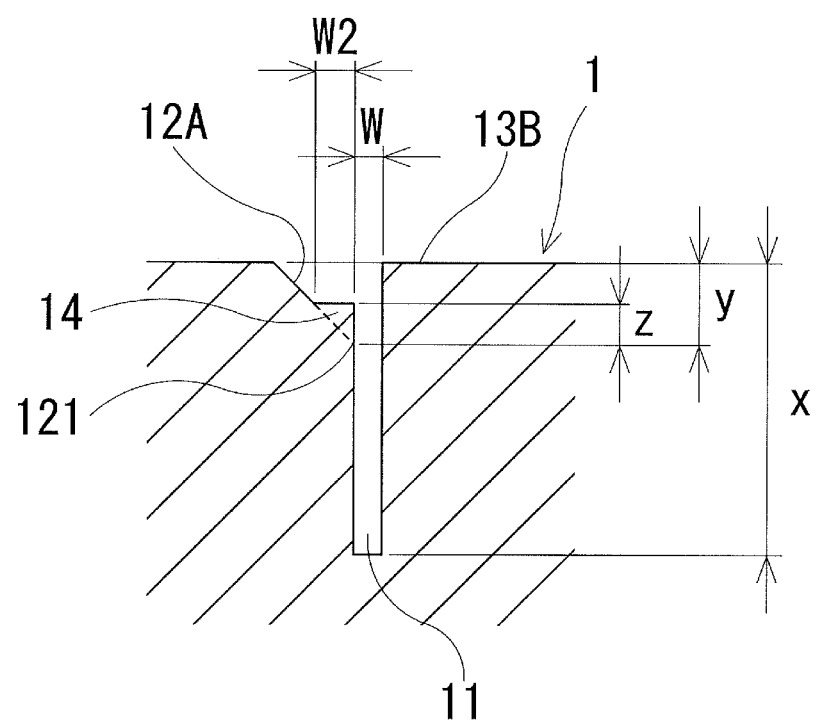
FIG. 5 is a cross-sectional view taken along line X-X in the direction of the arrow in FIG. 3.

FIG. 5 is a view orthogonal to the extension direction of the sipe, with the tread portion 1 cut away in the vertical direction. As illustrated in FIG. 5, the maximum depth of the sipe 11 is x (mm) and the maximum depth of the chamfered portion 12 is y (mm), and the sipe 11 and the chamfered portion 12 are formed so that the maximum depth y (mm) is less than the maximum depth x (mm). The maximum depth x of the sipe 11 is preferably from 3 mm to 8 mm. A sipe width W of the sipe 11 is substantially constant in a range from an end portion 121 located on the inner side of the chamfered portion 12 in the tire radial direction to the groove bottom of the sipe 11. In a configuration in which a protrusion is disposed on the groove wall of the sipe 11, for example, the sipe width W does not include the height of the protrusion. Also, in a configuration in which the sipe width of the sipe 11 gradually narrows toward the groove bottom, the width of the sipe 11 is substantially measured as the sipe width not including the narrow portion.

In the pneumatic tire described above, a raised bottom portion 14 is formed in at least one section of the chamfered portion 12. In FIGS. 2 to 4, the raised bottom portion 14 with substantially a parallelogram shape in a plan view is formed on the chamfered portion 12A, but the shape of the raised bottom portion (projection) is not particularly limited to this shape, and for example, a triangular shape, another quadrangular shape, an elliptical shape, or the like can be employed. Additionally, in FIGS. 2 to 4, the raised bottom portion 14 is formed on a central portion of the chamfered portion 12A in the tire lateral direction along a wall surface of the sipe 11 on the leading side. With the raised bottom portion 14 being disposed at a position facing the edges 11A, 11B and extending in the longitudinal direction of the sipe 11, an effect of suppressing the collapse of the edges 11A, 11B facing the raised bottom portion 14 may be obtained. Furthermore, in FIG. 5, the raised bottom portion 14 includes a top surface parallel with the road contact surface of the tread portion 1 and a side surface parallel with the wall surface of the sipe 11. However, the shape of the top surface and the side surface of the raised bottom portion 14 is not particularly limited to this shape, and for example, a shape having a surface (inclined surface) that is not parallel with the road contact surface of the tread portion 1 or the wall surface of the sipe 11 can be employed.

In the pneumatic tire described above, the chamfered portion 12 that is shorter than the sipe length L of the sipe 11 is provided on each of the edge 11A on the leading side and the edge 11B on the trailing side of the sipe 11, and the non-chamfered regions 13 in which other chamfered portions are not present are disposed at the portions facing the chamfered portions 12 of the sipe 11. Thus, the drainage effect can be improved with the chamfered portions 12, and a water film can be effectively removed by the edge effect in the non-chamfered regions 13 in which the chamfered portion 12 is not provided. As a result, the steering stability performance on wet road surfaces can be greatly improved. Moreover, the chamfered portion 12 and the non-chamfered region 13 in which chamfered portions are not present are disposed alongside each other on the edge 11A on the leading side and the edge 11B on the trailing side in this manner. Thus, the effect of enhancing wet performance as described above when braking and driving can be maximally achieved. Furthermore, since the raised bottom portion 14 is disposed in at least one section of the chamfered portion 12, the raised bottom portion 14 of the chamfered portion 12 acts to suppress movement of the block 20 when the tire come into contact with the ground. This can increase block rigidity. As a result, the steering stability performance on dry road surfaces and the steering stability performance on wet road surfaces can be enhanced in a well-balanced manner.

In the pneumatic tire described above, the maximum depth x (mm) and the maximum depth y (mm) preferably satisfy the relationship of Formula (1) below. By providing the sipes 11 so as to satisfy the relationship of Formula (1) below, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Here, when y<x×0.1 is true, the drainage effect from the chamfered portions 12 is insufficient, and when y>x×0.3+1.0 is true, the rigidity of the rib 10 is reduced, leading to a reduction in the steering stability performance on dry road surfaces. In particular, the relationship y≤x×0.3+0.5 is preferably satisfied.

$$x \times 0.1 \leq y \leq x \times 0.3 + 1.0 \qquad (1)$$

Additionally, a projected area A2 of the raised bottom portion 14 of the chamfered portion 12 is preferably from 5% to 40% of a projected area A1 of the chamfered portion 12. By appropriately setting the projected area A2 of the raised bottom portion 14 with respect to the projected area A1 of the chamfered portion 12 in this manner, the steering stability performance on dry road surfaces and the steering stability performance on wet road surfaces can be enhanced in a well-balanced manner. Here, when the ratio is less than 5%, the effect of enhancing steering stability performance on dry road surfaces cannot be sufficiently obtained, and when the ratio exceeds 40%, the effect of enhancing steering stability performance on wet road surfaces cannot be sufficiently obtained.

As illustrated in FIG. 4, the maximum width of the chamfered portion 12 measured in the direction orthogonal to the sipe 11 is defined as a width W1, and the maximum width of the raised bottom portion 14 of the sipe 12 is defined as a raised bottom width W2. Here, the raised bottom width W2 of the raised bottom portion 14 of the chamfered portion 12 is preferably from 40% to 80% of the chamfer width W1 of the chamfered portion 12. By appropriately setting the raised bottom width W2 of the raised bottom portion 14 with respect to the chamfer width W1 of the chamfered portion 12 in this manner, the steering stability performance on dry road surfaces and the steering stability performance on wet road surfaces can be enhanced in a well-balanced manner. Here, when the ratio is less than 40%, the effect of enhancing steering stability performance on dry road surfaces cannot be sufficiently obtained, and when the ratio exceeds 80%, the effect of enhancing steering stability performance on wet road surfaces cannot be sufficiently obtained.

Additionally, in the raised bottom portion 14 of the chamfered portion 12, the length in the tire lateral direction from one end portion to the other end portion is defined as a raised bottom length L2. Here, the raised bottom length L2 of the raised bottom portion 14 is preferably from 5% to 40% of the chamfer length $L_A$ or the chamfer length $L_B$ of the chamfered portion 12, and more preferably from 20% to 30%. By appropriately setting the raised bottom length L2 of the raised bottom portion 14 with respect to the chamfer lengths $L_A$, $L_B$ of the chamfered portion 12 in this manner, the steering stability performance on dry road surfaces and the steering stability performance on wet road surfaces can be enhanced in a well-balanced manner. Here, when the ratio is less than 5%, block rigidity is reduced and the effect of enhancing steering stability performance on dry road surfaces cannot be sufficiently obtained, and when the ratio exceeds 40%, the effect of enhancing steering stability performance on wet road surfaces cannot be sufficiently obtained.

As illustrated in FIG. 5, the depth of the raised bottom portion 14 of the chamfered portion 12 from the top surface of the raised bottom portion 14 to the end portion 121 located on the inner side of the chamfered portion 12 in the tire radial direction is defined as a raised bottom depth z (mm). Here, the raised bottom depth z (mm) of the raised bottom portion 14 is preferably from 20% to 80% of the maximum depth y (mm) of the chamfered portion 12, and more preferably from 40% to 60%. By appropriately setting the raised bottom depth z of the raised bottom portion 14 with respect to the maximum depth y of the chamfered portion 12 in this manner, the steering stability performance on dry road surfaces and the steering stability performance on wet road surfaces can be enhanced in a well-balanced manner. Here, when the ratio is less than 20%, deformation of the block 20 cannot be sufficiently suppressed and steering stability performance on dry road surfaces is reduced, and when the ratio exceeds 80%, the effect of enhancing steering stability performance on wet road surfaces cannot be sufficiently obtained. Note that in a case in which the top surface of the raised bottom portion 14 is inclined, the depth from the outermost end portion of the raised bottom portion 14 in the tire radial direction to the end portion 121 of the chamfered portion 12 is defined as the raised bottom depth z.

Figure 6:
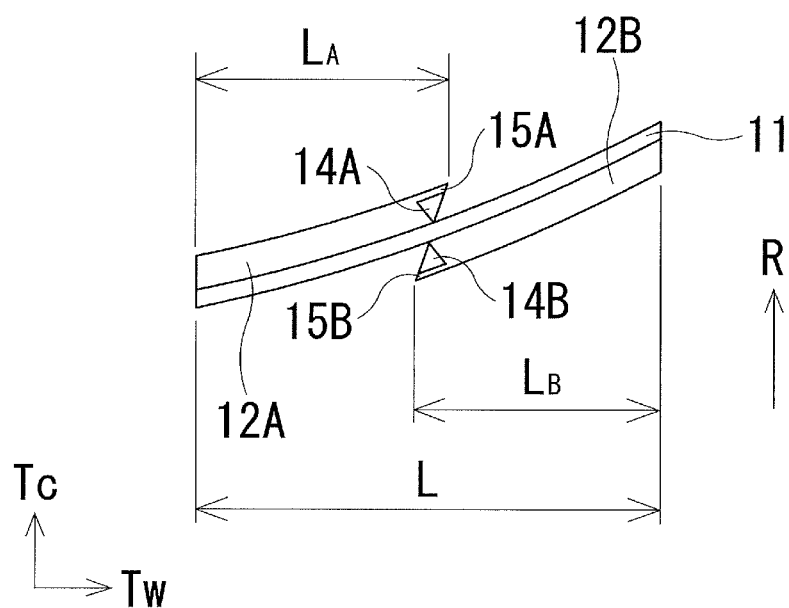
FIG. 6 is a plan view illustrating a modified example of a sipe and chamfered portions thereon formed in the tread portion of a pneumatic tire according to an embodiment of the present technology.

FIG. 6 is a diagram illustrating a modified example of a sipe and chamfered portions thereon formed in the tread portion of a pneumatic tire according to an embodiment of the present technology. As illustrated in FIG. 6, the chamfered portions 12A, 12B include turned back portions 15A, 15B formed at an acute angle at the end portion on the center side of the rib 10. Furthermore, raised bottom portions 14A, 14B that have a triangular shape in a plan view are formed in the chamfered portions 12A, 12B. The raised bottom portions 14A, 14B are disposed adjacent to the turned back portions 15A, 15B. By disposing the raised bottom portion 14 of the chamfered portion 12 in this manner, the turned back portion 15 of which block rigidity is particularly prone to being reduced can be reinforced, leading to an improvement in block rigidity. As a result, the steering stability performance on dry road surfaces and the steering stability performance on wet road surfaces can be enhanced in a well-balanced manner.

Figure 7:
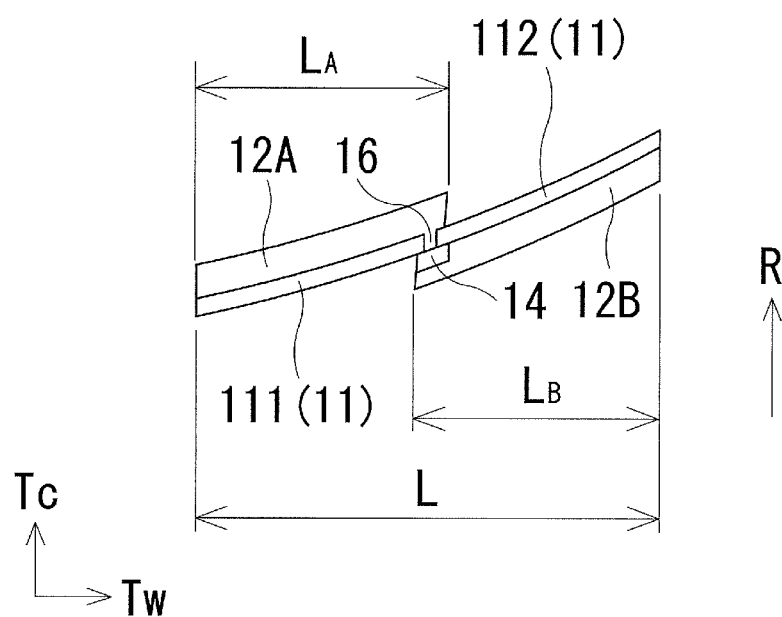
FIG. 7 is a plan view illustrating another modified example of a sipe and chamfered portions thereon formed in the tread portion of a pneumatic tire according to an embodiment of the present technology.

FIG. 7 is a diagram illustrating another modified example of a sipe and chamfered portions thereon formed in the tread portion of a pneumatic tire according to an embodiment of the present technology. As illustrated in FIG. 7, the chamfered portions 12A, 12B of the sipe 11 are formed so that portions of both of the chamfered portions 12A, 12B overlap. The sipe 11 is provided with a discontinuous portion 16 at a position where portions of the chamfered portions 12A, 12B facing one another overlap. The discontinuous portion 16 is a portion where the sipes 11 are not connected. In other words, the sipe 11 includes two types of sipes 111, 112 that are divided by the discontinuous portion 16. The sipe 111 is a sipe extending from one main groove 9 of the main grooves 9 located on both sides of the rib 10, and the sipe 112 is a sipe extending from the other main groove 9. The sipes 111, 112 each include two end portions, with one end opening to the main groove 9 and the other end portion terminating within the rib 10. Furthermore, the raised bottom portion 14 is formed in the chamfered portion 12B and disposed adjacent to the discontinuous portion 16. In other words, the raised bottom portion 14 is disposed so as to include the discontinuous portion 16 of the sipe 11 in the tire lateral direction. With the raised bottom portion 14 of the chamfered portion 12 being disposed in this manner, the steering stability performance on dry road surfaces and the steering stability performance on wet road surfaces can be enhanced in a well-balanced manner.

Figure 8:
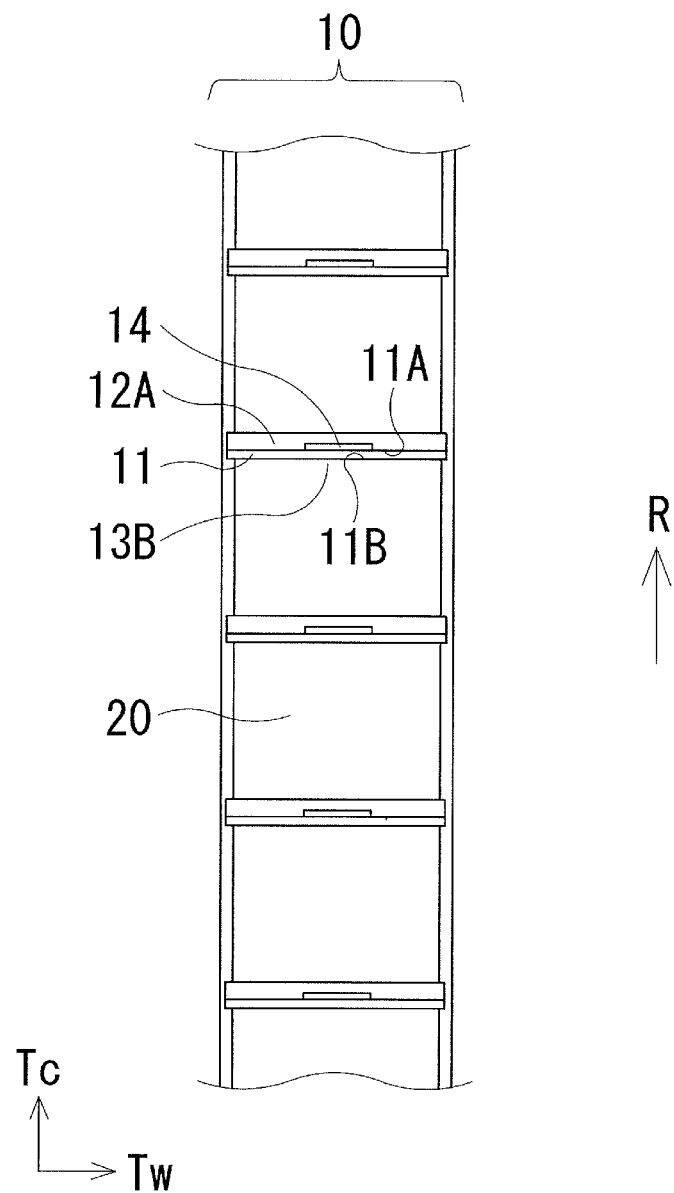
FIG. 8 is a plan view illustrating another modified example of a sipe and chamfered portions thereon formed in the tread portion of a pneumatic tire according to an embodiment of the present technology.

FIG. 8 is a diagram illustrating another modified example of a sipe and chamfered portions thereon formed in the tread portion of a pneumatic tire according to an embodiment of the present technology. In FIG. 8, the sipe 11 includes the edge 11A on the leading side and the edge 11B on the trailing side. Of the edges 11A, 11B, the chamfered portion 12A is formed on the edge 11A on the leading side, and the non-chamfered region 13B in which chamfered portions are not present is disposed on the edge 11B on the opposing trailing side. On the chamfered portion 12A, the raised bottom portion 14 that is rectangular in a plan view is formed in the central portion of the chamfered portion 12A in the tire lateral direction.

In the pneumatic tire described above, the sipe 11 includes the edge 11A on the leading side and the edge 11B on the trailing side, the edge 11A on the leading side or the edge 11B on the trailing side includes the chamfered portion 12, and the raised bottom portion 14 is disposed in at least one section of the chamfered portion 12. This allows the drainage effect to be enhanced via the chamfered portion 12 and, with the raised bottom portion 14 formed in the chamfered portion 12 functioning to suppress the deformation of the blocks 20 when the tire comes into contact with the ground, block rigidity to be increased. As a result, the steering stability performance on dry road surfaces and the steering stability performance on wet road surfaces can be enhanced in a well-balanced manner.

Examples

Tires according to Conventional Examples 1 and 2 and Examples 1 to 7 were manufactured. The tires have a tire size of 245/40R19 and include, in a tread portion, main grooves extending in the tire circumferential direction and sipes extending in the tire lateral direction disposed in a rib defined by the main grooves. Also the tires are set according to Tables 1 and 2 for the following: chamfer arrangement (both sides or one side), size relationship between sipe length L and chamfer lengths $L_A$, $L_B$, chamfer provided at portion facing chamfered portion, raised bottom portion provided in chamfered portion, ratio of projected area A2 of raised bottom portion in chamfered portion to projected area A1 of chamfered portion (A2/A1×100%), ratio of raised bottom width W2 of raised bottom portion in chamfered portion to chamfer width W1 of chamfered portion (W2/W1×100%), ratio of raised bottom length L2 of raised bottom portion in chamfered portion to chamfer lengths $L_A$, $L_B$ of chamfered portions (L2/$L_{A, B}$×100%), ratio of raised bottom depth z of raised bottom portion in chamfered portion to maximum depth y of chamfered portion (z/y×100%), and position of raised bottom portion in chamfered portion. In the tires of Conventional Examples 1 and 2 and Examples 1 to 7, the maximum depth y of the chamfered portion is less than the maximum depth x of the sipe, and the sipe width is constant in a range from an end portion located on an inner side in a tire radial direction of the chamfered portion to a groove bottom of the sipe.

These test tires underwent a sensory evaluation by a test driver for steering stability performance on dry road surfaces and steering stability performance on wet road surfaces. The results thereof are shown in Tables 1 and 2.

The sensory evaluation for steering stability performance on dry road surfaces and steering stability performance on wet road surfaces was performed with the test tires on a wheel with a rim size of 19×8.5 J mounted on a vehicle and inflated to an air pressure of 260 kPa. Evaluation results are expressed as index values, with the results of Conventional Example 1 being assigned as an index value of 100. Larger index values indicate superior steering stability performance on dry road surfaces and steering stability performance on wet road surfaces.

TABLE 1-1

|  |  | Conventional Example 1 | Conventional Example 2 |
|---|---|---|---|
| Chamfer arrangement (both sides or one side) | | Both sides | One side |
| Size relationship between sipe length L and chamfer lengths $L_A$, $L_B$ | | L = $L_A$, $L_B$ | L = $L_A$ |
| Chamfer provided at portion facing chamfered portion | | Yes | No |
| Raised bottom portion provided in chamfered portion | | No | No |
| Ratio of projected area A2 of raised bottom portion in chamfered portion to projected area A1 of chamfered portion (A2/A1 × 100%) | | — | — |
| Ratio of raised bottom width W2 of raised bottom portion in chamfered portion to chamfer width W1 of chamfered portion (W2/W1 × 100%) | | — | — |
| Ratio of raised bottom length L2 of raised bottom portion in chamfered portion to chamfer lengths $L_A$, $L_B$ of chamfered portions (L2/$L_{A, B}$ × 100%) | | — | — |
| Ratio of raised bottom depth z of raised bottom portion in chamfered portion to maximum depth y of chamfered portion (z/y × 100%) | | — | — |
| Position of raised bottom portion in chamfered portion | Disposed adjacent to turned back portion | — | — |
| | Disposed adjacent to discontinuous portion | — | — |
| Steering stability performance on dry road surfaces | | 100 | 100 |
| Steering stability performance on wet road surfaces | | 100 | 95 |

TABLE 1-2

|  | Example 1 | Example 2 | Example 3 |
|---|---|---|---|
| Chamfer arrangement (both sides or one side) | Both sides | Both sides | Both sides |
| Size relationship between sipe length L and chamfer lengths $L_A$, $L_B$ | L > $L_A$, $L_B$ | L > $L_A$, $L_B$ | L > $L_A$, $L_B$ |
| Chamfer provided at portion facing chamfered portion | No | No | No |
| Raised bottom portion provided in chamfered portion | Yes | Yes | Yes |
| Ratio of projected area A2 of raised bottom portion in chamfered portion to projected area A1 of chamfered portion (A2/A1 × 100%) | 60% | 20% | 20% |

TABLE 1-2-continued

| | Example 1 | Example 2 | Example 3 |
|---|---|---|---|
| Ratio of raised bottom width W2 of raised bottom portion in chamfered portion to chamfer width W1 of chamfered portion (W2/W1 × 100%) | 30% | 30% | 60% |
| Ratio of raised bottom length L2 of raised bottom portion in chamfered portion to chamfer lengths $L_A$, $L_B$ of chamfered portions (L2/$L_{A, B}$ × 100%) | 3% | 3% | 3% |
| Ratio of raised bottom depth z of raised bottom portion in chamfered portion to maximum depth y of chamfered portion (z/y × 100%) | 10% | 10% | 10% |
| Position of raised bottom portion in chamfered portion — Disposed adjacent to turned back portion | No | No | No |
| Position of raised bottom portion in chamfered portion — Disposed adjacent to discontinuous portion | No | No | No |
| Steering stability performance on dry road surfaces | 105 | 105 | 107 |
| Steering stability performance on wet road surfaces | 103 | 105 | 105 |

TABLE 2-1

| | Example 4 | Example 5 |
|---|---|---|
| Chamfer arrangement (both sides or one side) | Both sides | Both sides |
| Size relationship between sipe length L and chamfer lengths $L_A$, $L_B$ | L > $L_A$, $L_B$ | L > $L_A$, $L_B$ |
| Chamfer provided at portion facing chamfered portion | No | No |
| Raised bottom portion provided in chamfered portion | Yes | Yes |
| Ratio of projected area A2 of raised bottom portion in chamfered portion to projected area A1 of chamfered portion (A2/A1 × 100%) | 20% | 20% |
| Ratio of raised bottom width W2 of raised bottom portion in chamfered portion to chamfer width W1 of chamfered portion (W2/W1 × 100%) | 60% | 60% |
| Ratio of raised bottom length L2 of raised bottom portion in chamfered portion to chamfer lengths $L_A$, $L_B$ of chamfered portions (L2/$L_{A, B}$ × 100%) | 10% | 10% |
| Ratio of raised bottom depth z of raised bottom portion in chamfered portion to maximum depth y of chamfered portion (z/y × 100%) | 10% | 55% |
| Position of raised bottom portion in chamfered portion — Disposed adjacent to turned back portion | No | No |
| Position of raised bottom portion in chamfered portion — Disposed adjacent to discontinuous portion | No | No |
| Steering stability performance on dry road surfaces | 109 | 111 |
| Steering stability performance on wet road surfaces | 105 | 105 |

TABLE 2-2

| | Example 6 | Example 7 |
|---|---|---|
| Chamfer arrangement (both sides or one side) | Both sides | Both sides |
| Size relationship between sipe length L and chamfer lengths $L_A$, $L_B$ | L > $L_A$, $L_B$ | L > $L_A$, $L_B$ |
| Chamfer provided at portion facing chamfered portion | No | No |
| Raised bottom portion provided in chamfered portion | Yes | Yes |
| Ratio of projected area A2 of raised bottom portion in chamfered portion to projected area A1 of chamfered portion (A2/A1 × 100%) | 20% | 20% |
| Ratio of raised bottom width W2 of raised bottom portion in chamfered portion to chamfer width W1 of chamfered portion (W2/W1 × 100%) | 60% | 60% |
| Ratio of raised bottom length L2 of raised bottom portion in chamfered portion to chamfer lengths $L_A$, $L_B$ of chamfered portions (L2/$L_{A, B}$ × 100%) | 10% | 10% |

TABLE 2-2-continued

|  | Example 6 | Example 7 |
|---|---|---|
| Ratio of raised bottom depth z of raised bottom portion in chamfered portion to maximum depth y of chamfered portion (z/y × 100%) | 55% | 55% |
| Position of raised bottom portion in chamfered portion — Disposed adjacent to turned back portion | Yes | No |
| Position of raised bottom portion in chamfered portion — Disposed adjacent to discontinuous portion | No | Yes |
| Steering stability performance on dry road surfaces | 113 | 113 |
| Steering stability performance on wet road surfaces | 105 | 105 |

As can be seen from Tables 1 and 2, by devising the shape of the chamfered portions formed on the sipes, the tires of Examples 1 to 7 have both enhanced steering stability performance on dry road surfaces and enhanced steering stability performance on wet road surfaces.

The invention claimed is:

1. A pneumatic tire, comprising:
   main grooves extending in a tire circumferential direction in a tread portion; and
   a sipe extending in a tire lateral direction disposed in a rib defined by the main grooves; wherein
   the sipe comprises an edge on a leading side and an edge on a trailing side;
   the edge on the leading side or the edge on the trailing side comprises a chamfered portion;
   only a single raised bottom portion is disposed in the chamfered portion,
   a raised bottom length of the raised bottom portion in the chamfered portion is from 5% to 40% of a chamfer length of the chamfered portion, and both the raised bottom length and the chamfer length are measured along the tire lateral direction, and
   a raised bottom width of the raised bottom portion in the chamfered portion is from 40% to 80% of a chamfer width of the chamfered portion.

2. The pneumatic tire according to claim 1, wherein a maximum depth x (mm) of the sipe and a maximum depth y (mm) of the chamfered portion satisfy a relationship $x \times 0.1 \leq y \leq x \times 0.3 + 1.0$.

3. The pneumatic tire according to claim 2, wherein a projected area of the raised bottom portion in the chamfered portion is from 5% to 40% of a projected area of the chamfered portion.

4. The pneumatic tire according to claim 3, wherein a raised bottom depth of the raised bottom portion in the chamfered portion is from 20% to 80% of a maximum depth y of the chamfered portion.

5. The pneumatic tire according to claim 1, wherein a projected area of the raised bottom portion in the chamfered portion is from 5% to 40% of a projected area of the chamfered portion.

6. The pneumatic tire according to claim 1, wherein a raised bottom depth of the raised bottom portion in the chamfered portion is from 20% to 80% of a maximum depth y of the chamfered portion.

7. A pneumatic tire, comprising:
   main grooves extending in a tire circumferential direction in a tread portion; and
   a sipe extending in a tire lateral direction disposed in a rib defined by the main grooves; wherein
   the sipe comprises an edge on a leading side and an edge on a trailing side;
   the edge on the leading side and the edge on the trailing side each comprise a chamfered portion shorter than a sipe length of the sipe;
   a non-chamfered region in which other chamfered portions are not present is provided at portions facing each of the chamfered portions of the sipe;
   a maximum depth y (mm) of each chamfered portion is less than a maximum depth x (mm) of the sipe;
   a sipe width of the sipe is constant in a range from an end portion located on an inner side in a tire radial direction of each chamfered portion to a groove bottom of the sipe;
   a raised bottom portion is disposed in at least one of the chamfered portions, the at least one of the chamfered portions including the raised bottom portion each including not more than a single one of the raised bottom portion;
   a raised bottom length of the raised bottom portion in the chamfered portion is from 5% to 40% of a chamfer length of the chamfered portion, and both the raised bottom length and the chamfer length are measured along the tire lateral direction; and
   a raised bottom width of the raised bottom portion in the chamfered portion is from 40% to 80% of a chamfer width of the chamfered portion.

8. The pneumatic tire according to claim 7, wherein
   each chamfered portion comprises a turned back portion shaped with an acute angle; and
   the raised bottom portion of the at least one of the chamfered portions is disposed adjacent to the turned back portion.

9. The pneumatic tire according to claim 7, wherein
   the sipe comprises a discontinuous portion at a position where portions of the chamfered portions that face one another overlap; and
   the raised bottom portion of the at least one of the chamfered portions is disposed adjacent to the discontinuous portion.

10. The pneumatic tire according to claim 7, wherein
    the maximum depth x (mm) of the sipe and the maximum depth y (mm) of each chamfered portion satisfies a relationship $x \times 0.1 \leq y \leq x \times 0.3 + 1.0$.

11. The pneumatic tire according to claim 7, wherein a projected area of the raised bottom portion in the at least one of the chamfered portions is from 5% to 40% of a projected area of the at least one of the chamfered portions.

12. The pneumatic tire according to claim 7, wherein a raised bottom depth of the raised bottom portion in the at least one of the chamfered portions is from 20% to 80% of the maximum depth y of the at least one of the chamfered portions.

* * * * *